United States Patent [19]
Jones

[11] Patent Number: 5,766,462
[45] Date of Patent: Jun. 16, 1998

[54] WATER TREATMENT APPARATUS

[75] Inventor: Denis Hector Jones, Redcliffe, Australia

[73] Assignee: Golview Pty Ltd, Brisbane, Australia

[21] Appl. No.: 647,968

[22] PCT Filed: Dec. 1, 1994

[86] PCT No.: PCT/AU94/00746

§ 371 Date: Jun. 3, 1996

§ 102(e) Date: Jun. 3, 1996

[87] PCT Pub. No.: WO95/15454

PCT Pub. Date: Jun. 8, 1995

[30] Foreign Application Priority Data

Dec. 1, 1993 [AU] Australia ............... PM2745

[51] Int. Cl.$^6$ ............................................. B01D 27/08
[52] U.S. Cl. ........................ 210/232; 210/236; 210/238;
210/321.87; 210/493.5; 210/500.23; 137/625.48;
137/597
[58] Field of Search .......................... 210/232, 236,
210/238, 136, 193, 287, 321.87, 493.5,
500.23; 137/625.48, 597

[56] References Cited

U.S. PATENT DOCUMENTS

| | | |
|---|---|---|
| 1,552,537 | 8/1925 | Brabson et al. |
| 2,469,921 | 10/1949 | Hoge. |
| 4,182,374 | 1/1980 | Spanides. |
| 4,529,515 | 7/1985 | Selz .................... 210/238 |
| 4,591,438 | 5/1986 | Tanabe et al. ........... 210/282 |
| 4,818,398 | 4/1989 | Lott et al. .............. 210/238 |
| 4,933,079 | 6/1990 | Kroha ................... 210/232 |
| 4,989,636 | 2/1991 | Hunter et al. ........... 210/232 |
| 5,092,990 | 3/1992 | Muramatsu et al. ........ 210/287 |

FOREIGN PATENT DOCUMENTS

| | | |
|---|---|---|
| 5256579 | 5/1981 | Australia. |
| 723767 | 4/1932 | France. |
| 1115542 | 4/1962 | Germany. |
| 2161144 | 6/1973 | Germany. |
| 3713296 | 11/1988 | Germany. |
| 342435 | 12/1959 | Switzerland. |
| 1050299 | 12/1966 | United Kingdom. |
| 2156489 | 9/1985 | United Kingdom. |
| 1056538 | 10/1987 | United Kingdom. |

OTHER PUBLICATIONS

Patent Abstracts of Japan, C–1247, p. 12, JP, A, 6–154739 (Hitachi LTD) 3 Jun. 1994.

*Primary Examiner*—W. L. Walker
*Attorney, Agent, or Firm*—Dvorak & Orum

[57] ABSTRACT

A water purifier assembly mounted to a water supply outlet for selective dispensing of water through a general purpose outlet or a filtered outlet includes a filter assembly having a filtered water outlet and a feed inlet, a valve assembly having a water supply inlet connected to the water supply outlet, an open valve chamber with a water inlet communicating with the water supply inlet and sealing lands at opposite sides of the water inlet, an externally operable valve means reciprocally moveable from one side of said inlet to the other side of said inlet for sealing engagement with a respective one of said sealing lands, and outlets from said valve chamber disposed at opposite sides of said valve means and outwardly of said sealing lands and respectively communicating with the general purpose outlet and said feed inlet. The filter assembly and includes a base part connected to the valve assembly and cap means for the base part, said cap means and said base part having complementary telescopic surfaces adapted for sealing engagement with each other, outwardly biased circlip means securing said cap means to said base part, and releasing means releasing said circlip means by pivoting of the filtered water spout to retract the circlip means.

22 Claims, 4 Drawing Sheets

WATER TREATMENT APPARATUS

This invention relates to water treatment apparatus and in particular to water purifier assemblies and apparatus therefore.

This invention has particular but not exclusive application to domestic water purifier assemblies and for illustrative purposes reference will be made hereinafter to such application. However it is to be understood that this invention could be used in other applications where flow diversion and/or filtration or purification is required.

Typically, domestic water purifier assemblies include a filter assembly for supplying filtered water for drinking purposes which is mounted above a kitchen sink in conjunction with the sink supply spout. Usually the purifier assembly includes an adaptor and valve assembly for connection to the sink combination and for selectively diverting flow to either the sink supply spout or the filter assembly.

One known valve assembly includes a rotary ball or plug type two-way valve. Such valves require close manufacturing tolerances for leakage prevention and accordingly are difficult to operate. They are also prone to the accumulation of mineral scale from untreated water and/or galvanic corrosion which further binds the mechanism and causes seizing.

Another known type of assembly includes a push/pull type valve wherein a cylindrical plug having piston mounted O-ring sealably slides in an in-line bore adaptor within the flow conduit to open and close an outlet port. In such assemblies the O-ring on the control piston which is moved to selectively control the flow must traverse a port in the wall of the piston chamber. This cause premature wear whereby the resultant cross leaking causes water to flow to both the sink supply spout and the filter assembly at the same time.

This type of assembly is also difficult to service because the in-line bore adaptor often seizes in position within the bore and access can be achieved only after disturbing the sealed connection between the adaptor and either the outlet spout or the filter assembly. Furthermore, repeated removal of the assembly from the combination or either the spout or the filter assembly from the assembly to allow for servicing does cause unnecessary wear and damage to the threads and seals.

This type of assembly by necessity places the push pull mechanism in-line with either the spout or the filter outlet. As a result in some applications it places the push pull mechanism in an inaccessible or inefficient location either behind or below the adaptor.

Typically the filter assembly requires weekly servicing which requires removal of a screw-on cap utilizing a compression seal type connection. In such assemblies the cap is difficult to remove. Furthermore, repeated removal of the cap for servicing causes damage to the screw threads such that early replacement of the cap and housing is required.

The present invention aims to alleviate at least one of the above disadvantages and to provide water treatment apparatus and in particular water purifier assemblies which will be reliable and efficient in use.

With the foregoing in view, this invention in one aspect resides broadly in a water purifier assembly of the type adapted for mounting to a water supply outlet for selective dispensing of water through a general purpose outlet or a filtered outlet and including:

a filter assembly having a filtered water outlet and a feed inlet;

an valve assembly having a water supply inlet connectable to the water supply outlet, an open valve chamber with a water inlet communicating with the water supply inlet and sealing lands at opposite sides of the water inlet;

an externally operable valve means moveable from one side of said inlet to the other side of said inlet for sealing engagement with a respective said sealing land, and outlets from said valve chamber disposed at opposite sides of said valve means and outwardly of said sealing lands and respectively communicating with the general purpose outlet and said feed inlet.

This invention in another aspect resides broadly in a valve assembly including:

a water supply inlet connectable to a water supply outlet;

an open valve chamber with a water inlet communicating with the water supply inlet and sealing lands at opposite sides of the water inlet;

an externally operable valve means moveable from one side of said inlet to the other side of said inlet for sealing engagement with a respective said sealing land, and outlets from said valve chamber disposed at opposite sides of said valve means and outwardly of said sealing lands.

Preferably the valve chamber has cylindrical end portions coaxial with said sealing lands and said outlets extend through the chamber wall of the valve assembly between said sealing lands and said end portions. It is also preferred that the valve means be a piston and rod assembly wherein the piston includes a sealing means such as an O-ring mounted therein for selective engagement with the valve lands the piston being operatively supported by the piston rod which extends outwardly therefrom. Preferably the piston rod extends through a removable end cap and is sealably engaged therewith and whereby removal of the end cap permits the piston and rod assembly to be withdrawn through the opened end portion. In a preferred form the piston rod extends outwardly from both sides of the piston and through opposed removable end caps allowing operation of the piston and rod assembly from both ends of the valve chamber and the sealing engagement is provided by O-rings mounted in the end caps for sealably supporting the piston rod and electrically isolating the piston assembly from the valve chamber. Furthermore, O-rings or like devices may be provided on the piston rod to prevent contact between the end faces of the piston and the end caps.

Preferably the water inlet is an annular recess having chamfered outer edges forming respective entries to the sealing lands to assist entry of the piston and sealing means therein and wherein the sealing means may move from an uncompressed state when accommodated in said annular recess to a compressed and sealing state when engaged with a respective one of said lands such that the sealing means does not move across and contact the water inlet in a compressed state. In the preferred form of the invention wherein the sealing means is an O-ring, contact between the O-ring and the chamber wall only occurs over the bearing lands which suitably extend axially by a distance equal to the diameter of the O-ring.

Preferably the inlet is of relatively small axial extent whereby the axial movement of the valve means required to divert inflowing water is small such as in the range of about ¼ of the bore of a reticulated water supply pipe and suitably in the range 2mm to 6mm.

The piston and rod assembly may be adapted to radially expand the sealing means to accommodate wear. For example the rod may comprise a pair of inter-engaging portions which compress the sealing means axially so as to expand it radially.

The valve means may be hollow closed piston extending through the valve chamber and having ports for alignment with an inlet and an outlet wherein the water may flow into the hollow and flow axially through the piston to exit through the outlet. In such embodiment the piston may be moved axially to align the respective ports with the inlet and the other outlet for diversion of flow to that outlet. Furthermore the piston may extend axially beyond the valve chamber for easy operation.

The valve assembly may include connection means extending radially outwardly from the valve chamber and communicating with the valve chamber via the inlet and outlets respectively for connection of the valve assembly to a water outlet and for connection of a sink spout or filter assembly thereto. Preferably the connection means extending from the two outlets are identical such that the valve assembly may be fitted to a horizontally or vertically extending outlet wherein the valve means may be maintained in a horizontal position and access for movement of the valve means to open or close either outlet be provided.

In another aspect this invention resides broadly in a water purifier assembly of the type adapted for mounting to a water supply outlet for selective dispensing of water through a general purpose outlet or a filtered outlet and including a filter assembly having a filtered water outlet and a valve assembly connectable to the water supply outlet and having valve means for selectively diverting water supplied from said water supply outlet to said filter assembly, wherein said filter assembly includes a housing assembly for housing active filter means and including a base part connectable to the valve assembly and cap means for the base part;

said cap means and said base part having complementary telescopic surfaces adapted for sealing engagement with each other;

securing means for securing said cap means to said base part, and externally accessible releasing means for releasing said securing means.

This invention in yet another aspect resides broadly in a filter assembly including:

a housing assembly having a base part and a cap wherein said cap and said base part have complementary inner and outer surfaces adapted for sealing engagement with each other; and securing means for securing said cap to said base part, and external releasing means for releasing said securing means.

In a preferred form of the invention the securing means is an outwardly biased circlip which engages in a groove formed in the base part and is retractable into a supporting groove in the cap means for release of the cap means from the base part. In such embodiment the circlip is formed with spaced apart arms extending inwardly from the free ends of the circlip for selective engagement with releasing means operable to force one arm towards the other for retracting the circlip from the circlip groove. Furthermore, the inwardly directed arms may inter-engage so that both free ends of the circlip are retracted. Other means of retracting the circlip may be utilized. For example, the free ends of the circlip may have pins engageable in opposed converging cam grooves on a rotary plate which may be rotated to move the ends towards one another thereby contracting the circlip to enable release from the circlip groove. Such rotary plate may be rotatable by an externally accessible actuator offset from the axis of the circlip and suitably a rotary actuator for ease of sealing engagement with the cap wall.

The releasing means may be rotatable for actuation about the circlip axis and may be an independent member or a portion of the cap means itself. Preferably however, the releasing means is a laterally extending spout communicating with the housing assembly and rotatable relative thereto for retracting the circlip.

The securing means may be a plurality of clips or lugs mounted to the cap means and arranged to engage with corresponding recesses formed in the base part or vice versa.

Preferably the cap part includes sealing means such as an O-ring whose sealing increases/improves upon increased water pressure in the filter assembly.

In order that this invention may be more readily understood and put into practical effect reference will now be made to the accompanying drawings which illustrate a preferred embodiment of the invention and wherein.

Figure 2:
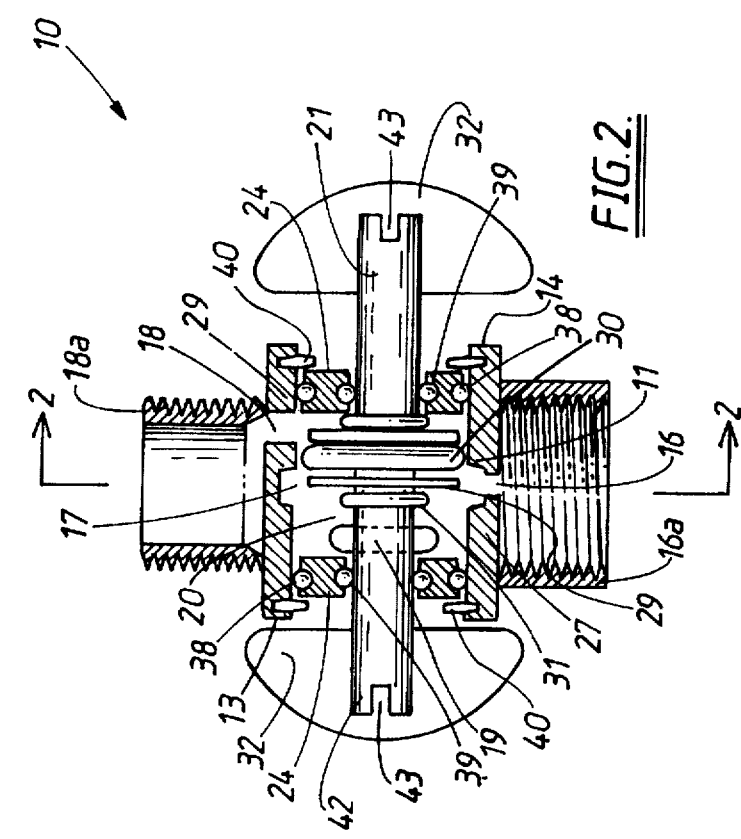
FIG. 2 is a sectional front elevation of the valve assembly of FIG.1 viewed at 90° to the elevation of FIG. 1 along 1—1.

The valve assembly 10 illustrated in the drawings includes a substantially cubic valve body 11 having a cylindrical valve chamber 12 extending therethrough between opposed valve body ends 13 and 14.

A water supply inlet 16 extends radially through the valve body 11 to enter the valve chamber 12 along a medial plane thereof. The inlet 16 is a part-circumferential slot extending over approximately 30° of the chamber circumference and entering the chamber in a fully circumferential recess 17.

Outlets 18 and 19 are also in the form of part-circumferential slots which extend through the valve body and into the valve chamber on opposed sides of the inlet 16. The outlets 18 and 19 are spaced radially about the axis of the chamber 12 from the inlet 16 by 90° and 180° respectively. The axial width of the slots 18 and 19 is relatively small in comparison to the diameter of the valve body. Threaded connections 16a, 18a and 19a extend outwardly from the valve body and are in fluid communication with the inlet and outlet 16, 18 and 19 respectively for connection to the water supply, filter assembly and sink spout. The fittings may be cast or molded with the valve body or alternatively may be soldered or braised or threaded to the valve body as required. Of course, other types of fittings may be utilised.)

A piston and rod assembly 20 including a rod 21 and piston means 22 mounted centrally thereon is supported in the valve chamber 12 by end caps 24 mounted in the end portions of the valve chamber 12. The piston and rod assembly 20 is slidable for sealable engagement between a first circumferentially extending sealing land 26 located between the first outlet 18 and the inlet 16 and a second circumferentially extending sealing land 27 located between the second outlet 19 and the inlet 16.

The piston means 22 comprises a pair of spaced apart discs 29 of smaller diameter than the bore of the chamber 12 sandwiching and supporting an O-ring 30 therebetween for sealingly engaging the sealing lands 26 and 27 as selected.

A pair of O-rings 31 are mounted on the rod 21 outwardly of and adjacent to the discs 29 for preventing contact of the disc 29 with the end caps 24 so as to electrically isolate the disc from the end cap and to partially absorb shock produced by rapid movement of the piston and rod assembly which may occur if moved whilst under pressure.

Figure 3:
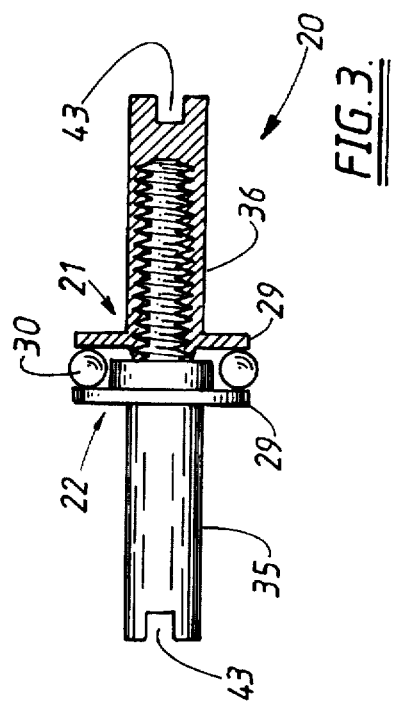
FIG. 3 is a sectional front elevation of a valve means according to the invention.
Figure 1:
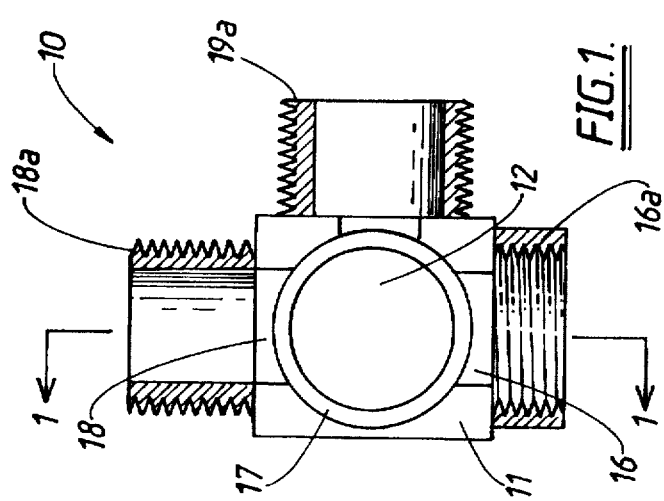
FIG. 1 is a sectional end elevation of a valve assembly along line 2—2 according to the invention.

The piston and rod assembly illustrated in FIG. 3 includes a pair of inter-engaging rod portions 35 and 36 which threadably engage for axial adjustment thereof so as to be able to axially compress the O-ring 30 to expand it radially thereby compensating for wear of the O-ring or the valve body 11. Advantageously it will seen that no disassembly of the valve is required to make this adjustment as wear can be detected by leakage such that inspection of the O-ring is not required. Control knobs 32 are removably mounted to the ends of the rod 21 to provide an easy pushing or pulling surface for moving the piston and rod assembly to allow flow through either the first or second outlet 18 or 19. It will be appreciated that the slots 43 formed in the end portions 42 of the rod 21 provide a means of engagement of the knobs 32 with the rod so that the portions 35 and 36 may be rotated relative to each other without tools thereby allowing easy adjustment of the O-ring 30. The slots may also be used for adjustment of the O-ring by screwdriver upon removal of the caps 32 if required.

The end caps 24 comprise a disc 37 suitably grooved in their outer surface to accept an O-ring 38 for sealing engagement with the valve body 11 and in their inner surface to accept an O-ring 39 for sealing engagement with the rod 21. The O-rings 38 and 39 stand proud of the discs 37 and act to electrically isolate the end caps 24 from the rod 21 and the valve body 11 thereby avoiding any possible galvanic corrosion and consequent scale build-up and providing a smooth sliding action of the piston and rod assembly 20.

The end caps 24 are maintained in the valve body 11 by externally mounted circlips removal of one of which allows removal of the piston and rod assembly 20 for servicing. The circlips may be constructed of a plastics material if required. It will be appreciated that removal of the valve assembly from the water supply outlet is not required.

Furthermore, removal of items such as a filter assembly or a sink spout from the valve assembly is also not required.

Thus sealed screw threaded connections do not need to be disturbed for servicing.

In use the valve assembly 10 is mounted to a water supply outlet preferably above a sink wherein the sink spout may be attached to the fitting 18a or 19a as required, depending upon whether the water supply outlet is horizontal or vertical. A filter assembly preferably of the type described herein or other unit requiring water such as an in-house plant watering system may be connected to the other outlet.

Typically the valve assembly is mounted to a combination hot/cold water outlet controlled by separate taps, and is operable to divert water selectively to either the general purpose outlet or the filtered outlet.

Upon opening of the normal sink tap water may enter the valve chamber 12 through the inlet 16 for diversion to either outlet 18 or 19 as required. The other outlet may be selected by simply moving the piston and rod assembly 20 from contact with one sealing land axially through the valve chamber 12 and access the recess 17 until the piston 22 and O-ring 30 engage with the other sealing land. It will be appreciated that the O-ring 30 does not contact the chamber walls at any place other than at the sealing lands and thus wearing movement is minimal. The piston and rod assembly 20 may be moved whilst the main sink tap is in the open position but preferably the sink tap is turned off prior to movement of the piston and rod assembly.

If desired the valve assembly 10 may be utilised without taps by arranging the piston to seal the inlet 16 when disposed intermediate the sealing lands.

The valve assembly 10 may be serviced by simply removing the knobs 42 and the circlips 40. The piston and rod assembly can then be removed from the valve chamber 12 through either open end of the valve chamber. It will be appreciated that the valve assembly can be serviced without removal of the valve body 11 from the water supply outlet or removal of the filter assembly and/or sink spout from the outlets 18a and 19a.

Figure 4:
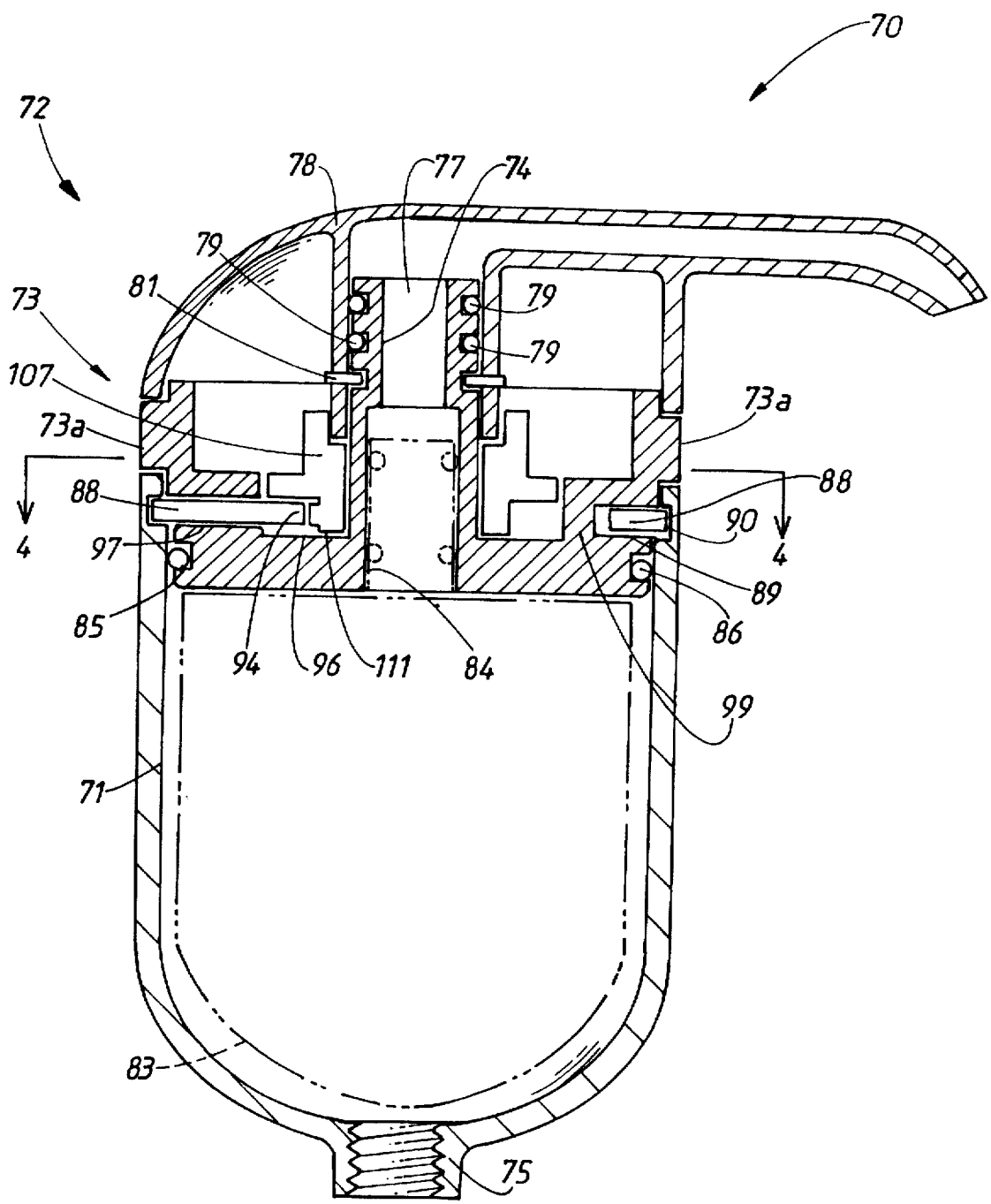
FIG. 4 is a sectional front elevation of a filter assembly according to the invention.

The filter assembly 70 illustrated in FIG. 4 includes a hollow open top cylindrical base part 71 and a complementary substantially cylindrical cap assembly 72 formed with a reduced portion 73 suitably engaged in the open top portion 71a. An internally threaded inlet 75 is formed in the bottom of the base part for connection to the feed outlet of the valve assembly 10.

The spigot portion 73 includes a centrally located spigot 74 upstanding therefrom and having a cylindrical flow passage 77 formed therethrough for supplying water to the spout 78 which is rotatably engaged about the outer cylindrical face of the spigot 74 and is sealed therewith by a suitably spaced pair of O-rings 79. The spout 78 is secured to the spigot 74 for preventing axial movement relative thereto by a permanently located snap lock clip 81.

The flow passage 77 is suitably sized at its lower end to sealably accept the spigot 84 extending from the filter element 83. Of course other forms of engagement between the filter element and the cap assembly may be utilised. For example, the spigot could extend downwardly from the reduced portion 73 to be received in a socket formed in the filter element.

The reduced portion 73 of the cap assembly 72 includes an O-ring 86 suitably seated in a groove 85 for sealing against the inner face of the cylindrical base part 71.

An outwardly biased circlip 88 rests in a circlip groove 89 formed in the outer cylindrical surface of the reduced portion 73 and is spaced above the O-ring groove 85. The circlip 88 engages in a corresponding circlip groove 90 formed in the inner cylindrical wall of the base part 71 near the open top thereof.

Figure 5:
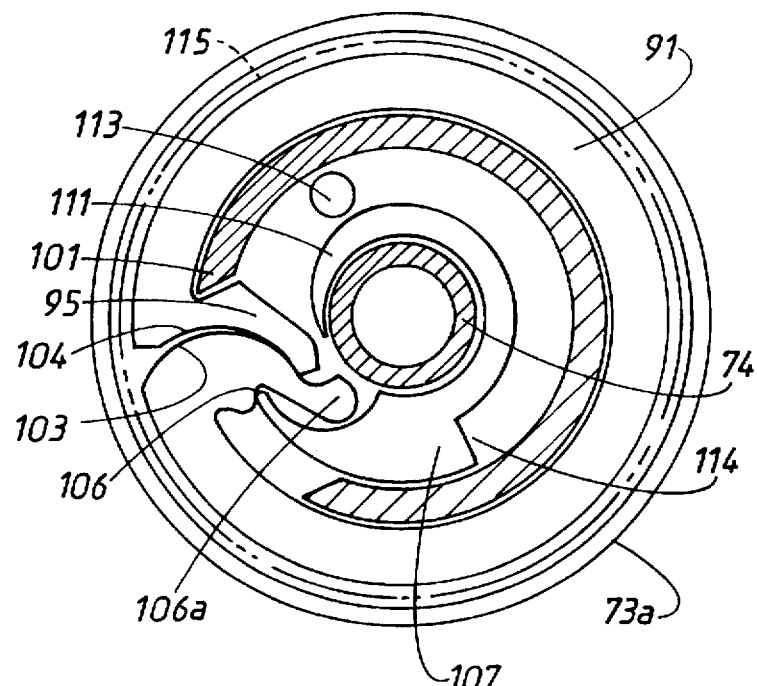
FIG. 5 is a sectional plan of a cap assembly according to the invention with the circlip in the retracted position, taken along the line 4—4 of FIG. 4.
Figure 6:
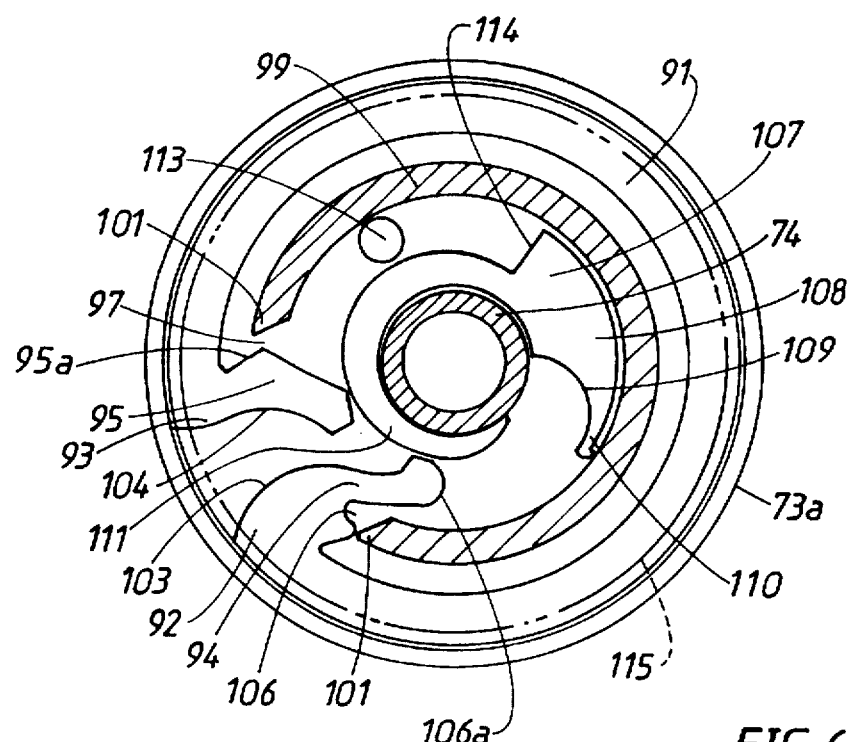
FIG. 6 is a corresponding sectional plan of the cap assembly of FIG. 5 with the circlip in the engaged position.
Figure 7:
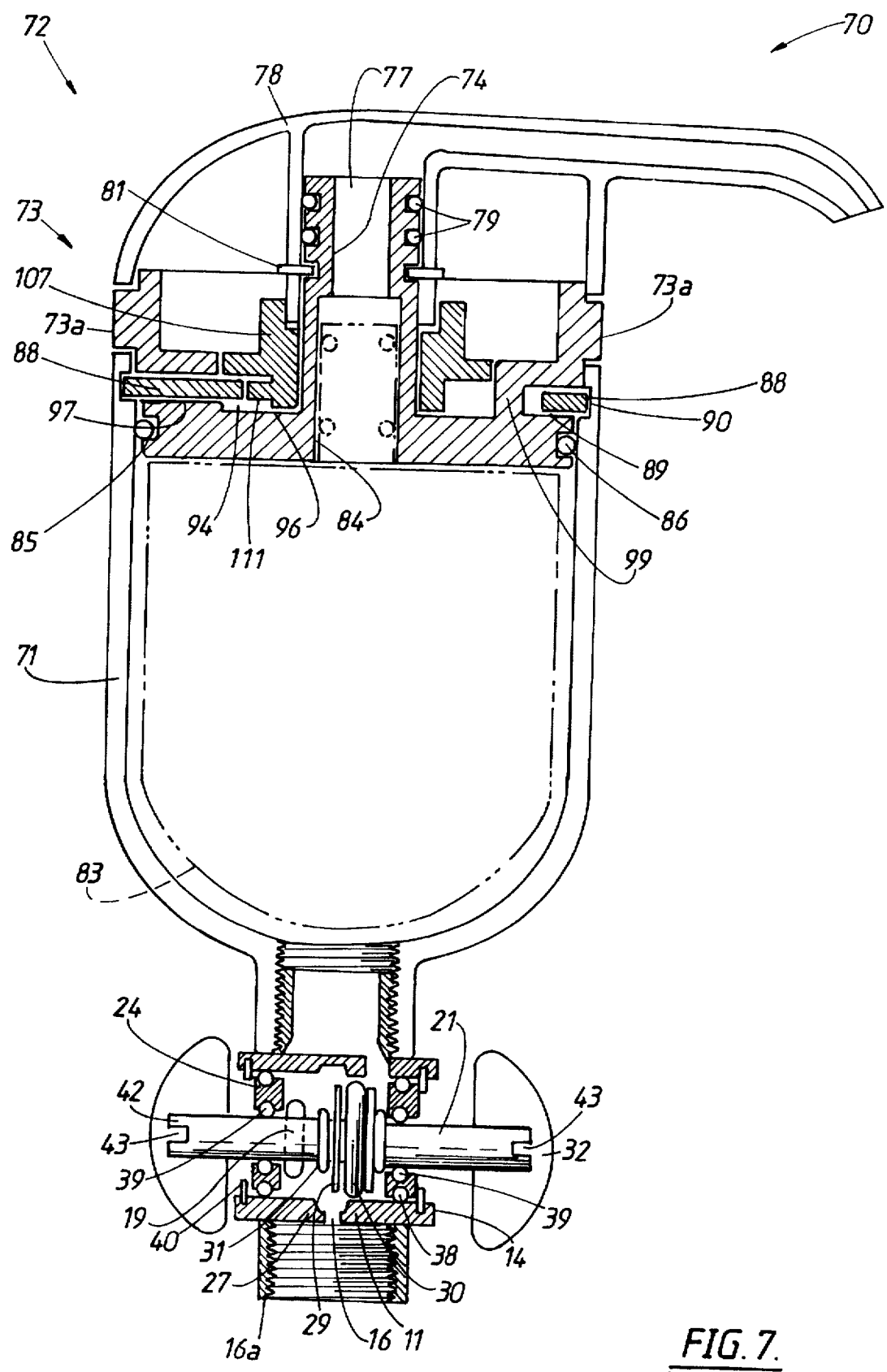
FIG. 7 is a sectional front elevation of a water purifier assembly according to the invention.

The circlip 88 includes a ring portion 91 terminated by two free end portions 92 and 93. Retraction arms 94 and 95 extend inwardly from the free-ends 92 and 93 respectively through an opening 97 formed in an internal wall 99 of the reduced portion 73 to be received in a cylindrical cup like recess 96 bounded by the inner wall 99, as illustrated in FIGS. 5 and 6. The opening 97 is bounded by ends at the opening 97 in outwardly pointed end portions 101 adapted to engage with the correspondingly shaped rear faces of the arms 94 and 95 for retraction of the circlip 88. The opposed faces 103 and 104 of the arms 94 and 95 respectively have a curved nesting shape such that rotational movement of the arm 94 towards the arm 95 leading to engagement of the arms causes inward movement of the arm 95 thereby retracting the end portion 93 radially inwardly.

A release member 107 is rotatably mounted about the upstanding spigot 74 and rests in the cup like recess 96 for engagement with the circlip arms, 94 and 95. The release member 107 includes a circumferentially extending cam hook member 108 having a leading front portion 110 for engagement with a recess 106 formed in the rear side of the circlip arm 94. In use, and coincidentally, the curved inner wall 109 of the hook member 105 engages with a complementary curved part 106a of the circlip arm 94.

The release member 107 also includes a part cylindrical locking member 111 for preventing inward movement of the circlip arms 94 and 95 and release of the cap assembly during normal filtering operation when the hook member 108 is remote from the arm 94.

In use, water flows into the filter assembly 70 through the inlet 75 and percolates through the filter element 83 before exiting via spout 78. The cap assembly 72 may be removed for servicing the filter assembly by holding the exposed wall portion 73a and rotating the spout 78 relative thereto. The release member 107 rotates with the spout 78 through a dog clutch connector at 120 such that the hook portion 108 contacts the recess 106 and forces the circlip to rotate in the groove 89 until the rear portion 95a abuts the outwardly pointed portion 101 thereby preventing further rotation of the circlip. Further rotation of the spout and release member forces the arm 94 to move inwardly whilst moving into contact with the opposed arm 93 wherein the curved surface 104 makes contact with the opposed curved surface 103 and also forces the arm 95 radially inwardly as illustrated in FIG. 5. When the circlip is fully retracted to the position shown at broken line 115 the cap assembly may be removed from the base part by lifting thereby allowing removal of the filter element 83 for cleaning and servicing as necessary. Replacement is the reverse operation.

Advantageously, the axial width of the piston is less than the axial width of the recess 17 such that the valve assembly may be utilized as a mixing valve wherein fluid may enter the valve chamber through the outlets 18 and 19 and exit as a mixture through the inlet 16. In such embodiment the piston and rod assembly may include an anchoring member such as a nut for fixedly locating the rod in a desired axial location.

It will be appreciated that the spout 78 may be pivoted about the spigot 74 by approximately 180degrees allowing it to be positioned as required above the sink. The locking pin 113 prevents reverse rotation of the release member 107 beyond a fully locked position thereby preventing damage to the rear face 114 of the arm 95.

Suitably the filter assembly is constructed of a plastics material but of course it may be constructed from any other suitable material such as stainless steel or brass.

I claim:

1. A water purifier assembly of the type adapted for mounting to a water supply outlet for selective dispensing of water through a general purpose outlet or a filtered outlet and including:

a filter assembly having a filtered water outlet and a feed inlet;

a valve assembly including a water supply inlet connectable to the water supply outlet, an open valve chamber with a water inlet communicating with the water supply inlet and sealing lands at opposite sides of the water inlet, said valve chamber having cylindrical end portions coaxial with said sealing lands;

an externally operable valve means moveable in said valve chamber for selective sealing engagement with either one of said sealing lands, and outlets from said valve chamber disposed at opposite sides of said valve means and outwardly of said sealing lands and respectively communicating with the general purpose outlet and said feed inlet, said outlets extending through the chamber wall of the valve assembly between said sealing lands and said end portions.

2. A water purifier assembly as claimed in claim 1, wherein said valve means includes a piston and rod assembly.

3. A water purifier assembly as claimed in claim 2, wherein said piston supports an O-ring adapted for sealable engagement with a said land and an externally accessible piston rod extending outwardly from said piston.

4. A water purifier assembly as claimed in claim 3, wherein said piston and rod assembly is adapted to radially expand the O-ring.

5. A water purifier assembly as claimed in claim 2, wherein said piston rod extends sealably through a removable end cap sealably engaged with said valve body.

6. A water purifier assembly as claimed in claim 5, wherein said removable end cap is sealably engaged in said valve chamber.

7. A water purifier assembly as claimed in claim 5, wherein said end cap is formed to allow removal of the piston and rod assembly from said valve chamber upon removal of said end cap.

8. A water purifier assembly as claimed in claim 5, wherein the piston rod constitutes one of a pair of opposed rods extending through respective removable end caps.

9. A water purifier assembly as claimed in claim 8, wherein the piston rod is supported by O-rings in said end caps.

10. A water purifier assembly as claimed in claim 8, wherein said O-rings prevent contact between said piston rod and said end caps.

11. A water purifier assembly as claimed in claim 8, and further including insulating means for preventing contact between said piston and said end cap(s).

12. A water purifier assembly as claimed in claim 11, wherein the insulating means includes a spacer which is fitted to the piston rod and prevents contact between said piston and said end cap.

13. A water purifier assembly as claimed in claim 12, wherein said spacer is an O-ring.

14. A water purifier assembly as claimed in claim 1, wherein said inlet includes an annular recess in said valve chamber.

15. A water purifier assembly as claimed in claim 1, wherein said outlets terminate in substantially identical threaded portions.

16. A valve assembly having a water supply inlet connectable to a water supply outlet, an open valve chamber with a water inlet communicating with the water supply inlet and sealing lands at opposite sides of the water inlet, said valve chamber having cylindrical end portions coaxial with said sealing lands;

an externally operable valve means movable in said valve chamber for selective sealing engagement with either one of said sealing lands, and outlets from said valve chamber disposed at opposite sides of said valve means and outwardly of said sealing lands, said outlets extending through the chamber wall of valve assembly between said sealing lands and said end portions.

17. A valve assembly as claimed in claim 16, wherein said annular recess has a axial length greater than the axial length of said piston.

18. A water purifier assembly of the type adapted for mounting to a water supply outlet for selective dispensing of water through a general purpose outlet or a filtered outlet and including a filter assembly having a filtered water outlet and a valve assembly connectable to the water supply outlet and having valve means for selectively diverting water supplied from said water supply outlet to said filter assembly, wherein said filter assembly includes a housing assembly for housing active filter means and including a base part connectable to the valve assembly and cap means for the base part;

said cap means and said base part having complementary telescopic surfaces adapted for sealing engagement with each other;

securing means in said cap or said base part for securing said cap means to said base part, said securing means being radially extendable and retractable for engagement in a recess provided in the other of said cap or base part, and externally accessible releasing means for releasing said securing means.

19. A water purifier assembly as claimed in claim 18, wherein said securing means includes a circlip.

20. A water purifier assembly as claimed in claim 18, wherein said securing means includes an outwardly biased circlip adapted to engage in a groove formed in the base part and retractable into a supporting groove in the cap means for release of the cap means from the base part, and wherein said circlip is formed with spaced apart arms extending inwardly from the free ends of the circlip for selective engagement with said releasing means.

21. A water purifier assembly as claimed in claim 20, wherein said releasing means is operable to force said arms towards one another.

22. A water purifier assembly as claimed in claim 21, wherein said releasing means is actuable by pivoting the filtered water spout relative to said cap means.

* * * * *